US009347782B1

(12) United States Patent
Capano (10) Patent No.: US 9,347,782 B1
(45) Date of Patent: May 24, 2016

(54) SYSTEM AND METHOD FOR SHARING A TRAVEL ITINERARY WITH A PROTECTIVE DETAIL

(71) Applicant: Jeff Capano, Liberty Township, OH (US)

(72) Inventor: Jeff Capano, Liberty Township, OH (US)

(*) Notice: Subject to any disclaimer, the term of this patent is extended or adjusted under 35 U.S.C. 154(b) by 0 days.

(21) Appl. No.: 14/534,966

(22) Filed: Nov. 6, 2014

(51) Int. Cl.
*G01C 21/34* (2006.01)

(52) U.S. Cl.
CPC ..................... *G01C 21/34* (2013.01)

(58) Field of Classification Search
CPC .. G01C 21/34; G01C 21/3476; G01C 21/343; G01C 21/3679; G08G 1/20
See application file for complete search history.

(56) References Cited

U.S. PATENT DOCUMENTS

| 6,622,083 | B1* | 9/2003 | Knockeart et al. | 701/533 |
|---|---|---|---|---|
| 8,878,871 | B2* | 11/2014 | Clark et al. | 345/629 |
| 9,065,836 | B1* | 6/2015 | Frank | H04L 63/104 |
| 2005/0154527 | A1* | 7/2005 | Ulrich | G06Q 10/08 701/517 |
| 2010/0256852 | A1* | 10/2010 | Mudalige | 701/24 |
| 2014/0298169 | A1* | 10/2014 | Williams | H04N 21/25841 715/716 |
| 2014/0365901 | A1* | 12/2014 | Moha et al. | 715/738 |

FOREIGN PATENT DOCUMENTS

| JP | 2005190470 A | * | 7/2005 |
|---|---|---|---|
| KR | 2007029322 A | * | 3/2007 |
| WO | WO 2013001553 A1 | * | 1/2013 |

* cited by examiner

Primary Examiner — Rodney Butler
(74) Attorney, Agent, or Firm — Vorys, Sater, Seymour and Pease LLP (57) ABSTRACT

A system for sharing a travel itinerary with a plurality of members of a protective detail tasked with protecting the security of an individual, includes one or more processors, one or more computer-readable tangible storage devices, and program instructions stored on at least one of the one or more storage devices for execution by at least one of the one or more processors. The program instructions include first program instructions to receive and storing data representative of an itinerary comprising at least one destination an individual intends to travel to. The program instructions further include second program instructions to identify a landmark based on the received itinerary. The program instructions further include third program instructions to associate the identified landmark with the itinerary. The program instructions further include fourth program instructions to communicate data representative of the itinerary and the associated landmark to members of a security detail.

20 Claims, 7 Drawing Sheets

SYSTEM AND METHOD FOR SHARING A TRAVEL ITINERARY WITH A PROTECTIVE DETAIL

BACKGROUND

A travel itinerary is commonly created by or for a traveler before leaving on a trip or journey. The itinerary provides a detailed plan for the trip including the starting point, the final destination, and other destinations or stops that are planned along the way. Accordingly, the itinerary provides the traveler with predictability and structure for the trip.

There may be a need, however, to identify destinations or landmarks that are not part of an itinerary but that may provide the traveler with additional predictability and structure for a trip. In particular, events may occur during the course of a trip, however, that are not planned for. As a result, it may be beneficial to have knowledge of certain landmarks or destinations that are not on the itinerary in order to accommodate those events. For example, if a traveler gets ill while at a destination on an itinerary, it may be beneficial to have knowledge of hospitals within proximity of that destination. It may also be beneficial to have knowledge of hospitals within proximity of the paths between the destinations of the itinerary in the event that the traveler becomes ill while traveling between destinations. In addition, it may also be beneficial to have knowledge of important or noteworthy destinations or landmarks that may not be on the itinerary but that are within proximity to the destinations of the itinerary or within proximity to the paths between the destinations of the itinerary. For example, it may be desirable to know if there is a landmark or destination that may pose a risk to the traveler or may cause a delay in the traveler's journey if the destination is not avoided. It may be difficult and time consuming, however, to identify destinations and landmarks that are not on the itinerary but that may provide the traveler with additional predictability and structure for a trip.

Additionally, there may be a need to share an itinerary with multiple individuals. Family, friends, or colleagues may be interested in or be required to have knowledge of a traveler's itinerary for the purpose of coordinating travel arrangements for the traveler or for peace of mind, for example. It may be difficult or time consuming, however, to efficiently share an itinerary with multiple individuals, particularly if the itinerary is confidential.

SUMMARY

A system for sharing a travel itinerary with a plurality of members of a protective detail tasked with protecting the security of an individual, includes one or more processors, one or more computer-readable tangible storage devices, and program instructions stored on at least one of the one or more storage devices for execution by at least one of the one or more processors. The program instructions include first program instructions to receive and store data representative of an itinerary comprising at least one destination to which an individual intends to travel. The program instructions further include second program instructions to identify a landmark based on the received itinerary. The program instructions further include third program instructions to associate the identified landmark with the itinerary. The program instructions further include fourth program instructions to communicate data representative of the itinerary and the associated landmark to members of a security detail.

A method includes the step of a computer receiving and storing data representative of an itinerary comprising at least one destination to which an individual intends to travel. The method further includes the step of a computer identifying a landmark based on the received itinerary. The method further includes the step of a computer associating the identified landmark with the itinerary. The method further includes the step of a computer communicating data representative of the itinerary and the associated landmark to a plurality of members of a security detail.

A computer program product includes one or more computer-readable tangible storage devices, and program instructions stored on at least one of the one or more storage devices. The program instructions include first program instructions to receive and store data representative of an itinerary comprising at least one destination. The program instructions further include second program instructions to identify a landmark based on the received itinerary. The program instructions further include third program instructions to associate the identified landmark with the itinerary. The program instructions further include fourth program instructions to communicate data representative of the itinerary and the associated landmark.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
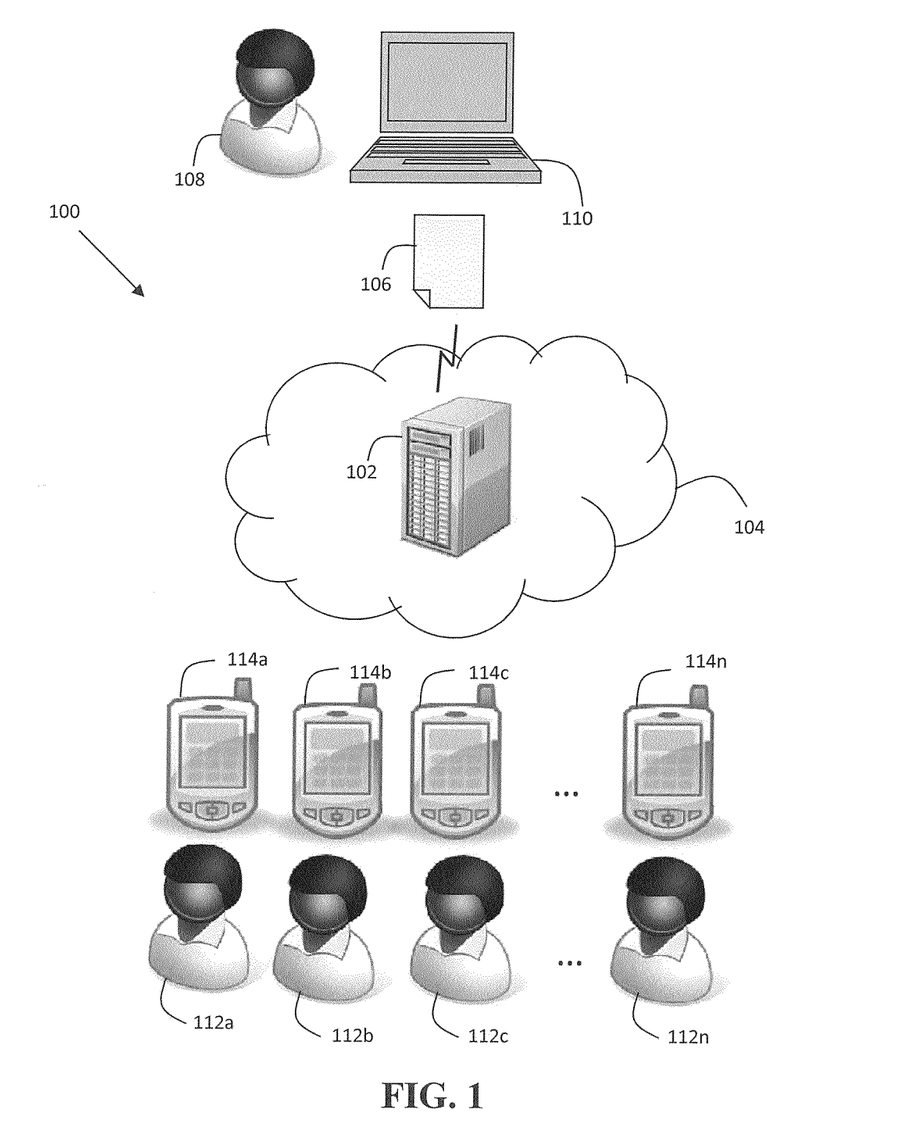
FIG. 1 illustrates an example system for sharing a travel itinerary with a protective detail.

FIG. 1 illustrates an example system 100 for sharing a travel itinerary with a protective detail. It should be appreciated that, although the example systems and methods described herein may make reference to a travel itinerary being analyzed and shared with a protective detail or other similar type of security team for the purpose of increasing protection and security for a subject, the example systems and methods may similarly be used by for other suitable purposes such as analyzing a travel itinerary for the purpose of leisure or business travel, for example.

System 100 includes an itinerary computer 102 disposed in a cloud environment 104 where it is accessible by multiple authorized computing devices. The itinerary computer 102 is configured to receive and store an itinerary 106. An itinerary 106 may be any suitable electronic data format such as a text file, a spreadsheet, database, and so on. In one example, the itinerary 106 may be comprise a predefined format such as a comma-delimited text file or an XML file with predefined fields, columns, rows, and so on. It should be appreciated that although the itinerary 106 is depicted as being received wirelessly, the itinerary 106 may be received via any suitable wired or wireless communication means such as a wired or wireless network, a cellular network, via Bluetooth, and so on.

The itinerary 106 may generated by a user 108 via a user input computer 110. A user 108 may be the person doing the traveling for which a security detail is being assigned. Alternatively, the user 108 may be any individual or organization responsible for creating an itinerary for the person doing the traveling. In one example, input computer 110 is configured to encrypt the itinerary 106 using a suitable encryption algorithm before communicating the itinerary 106 to itinerary computer 102 to prevent unauthorized access of the itinerary 106. In one example, itinerary computer 102 may be configured to encrypt the itinerary 106 before storing the itinerary 106 in the cloud environment 104. In one example, itinerary computer 102 may generate and store the itinerary 106 based on data received from user 108 via user input computer 110. For example, user input computer 110 may be configured to communicate a starting point, and endpoint, and destinations in between, while the itinerary computer 102 may be configured to generate and save the itinerary 106 according to a predefined format.

It should be appreciated that user input computer 110 is intended to represent various forms of digital computers including laptops, desktops, handheld computers, tablet computers, smartphones, servers, and other similar types of computing devices.

Itinerary computer 102 is further configured to analyze the itinerary 106 and to identify landmarks, that may be important for a security detail to have knowledge of, that are within proximity to the destinations identified on the itinerary 106 or within proximity to the routes being traveled on between the destinations on the itinerary 106. For example, itinerary computer 102 may identify hospitals, police stations, fire stations, military base camps, airports, safe houses, and known threats, for example. Such identified landmarks may provide the security detail with important information about resources that may be available while traveling an itinerary in the case of an emergency and may also provide the security detail with information about potential security threats that should be avoided or approached with caution. It should be understood that the proximity may be defined to be any suitable distance.

In one example, the itinerary computer 102 may store the identified landmarks in association with the itinerary 106. Thus, any time the itinerary 106 is accessed from the cloud environment 104, the associated landmarks are provided as well. In another example, the itinerary computer 102 is configured to identify the landmarks in real time when an itinerary is accessed. Thus, itinerary computer 102 may provide the most accurate and up-to-date information about the landmarks, including threats that have recently been identified, for example. In one example, the itinerary computer 102 is configured to identify and update the stored landmarks associated with an itinerary at predefined time intervals, such as once a day.

Landmarks may be identified by comparing the geographic locations of destinations on an itinerary with data predefined by a systems administrator. For example, an administrator may define a list of all known threats and safe houses for a given geographic region or regions. Itinerary computer 102 may then utilize the predefined list in connection with identifying and associating landmarks with an itinerary 106. In another example, itinerary computer 102 may be configured to utilize publically available information via a third party data provider in order to identify and associate landmarks with an itinerary 106. For example, itinerary computer 102 may use Google Maps or other suitable mapping system to identify landmarks such as police stations that are geographically within proximity of the destinations on the itinerary 106. In one example, itinerary computer 102 may enable an administrator or other appropriate user to modify the landmarks identified and associated with an itinerary 106. For example, if a member of the security detail has knowledge of a threat within proximity of a destination on the itinerary 106 but notices that the threat has not yet been identified and associated with the itinerary 106, the user may modify the associated landmarks to include the known threat.

Itinerary computer 102 is further configured to provide access to the itinerary 106 and the associated landmarks to one or more members of a security detail team 112a, 112b, 112c, and 112n (hereinafter referred to as security detail 112) via one or more security detail computers 114a, 114b, 114c, and 114n (hereinafter referred to as security detail computer 114). It should be appreciated that although itinerary computer 102 is depicted as providing four members of a security detail 112 with access to the itinerary 106, itinerary computer 102 can be configured to provide any suitable number of security detail 112 members with access to the itinerary 106.

In order to access the itinerary 106 and associated landmarks, a security detail computer 114 is configured to securely communicate with the itinerary computer 102 in the cloud environment 104 via a suitable secure communication protocol. For example, a security detail 112 may be required to authenticate via a username and password, or via other suitable means such as voice recognition, fingerprint recognition, and so on, in order to access the itinerary computer 102. Itinerary computer 102 is further configured to communicate the itinerary 106 to security detail computer in encrypted form to prevent unauthorized access to a subject's travel plans.

In one example, the security detail computer 114 may be configured to enable the security detail 112 to make changes to the identified landmarks and to communicate the changes to itinerary computer 102. Therefore, information such as newly discovered threats may be shared with all members of the security detail 112.

It should be appreciated that, although the security detail computer 114 is depicted as a mobile phone, security detail computer 114 is intended to represent various forms of digital computers, including laptops, desktops, handheld computers, tablet computers, smartphones, servers, and other similar types of computing devices.

It should be appreciated that, in addition to system 100 enabling a protective detail to increase protection and security for a subject during a trip, system 100 may also enable a protective detail to plan in advance and to anticipate potential security threats in order to be better prepared for an upcoming trip.

Figure 2:
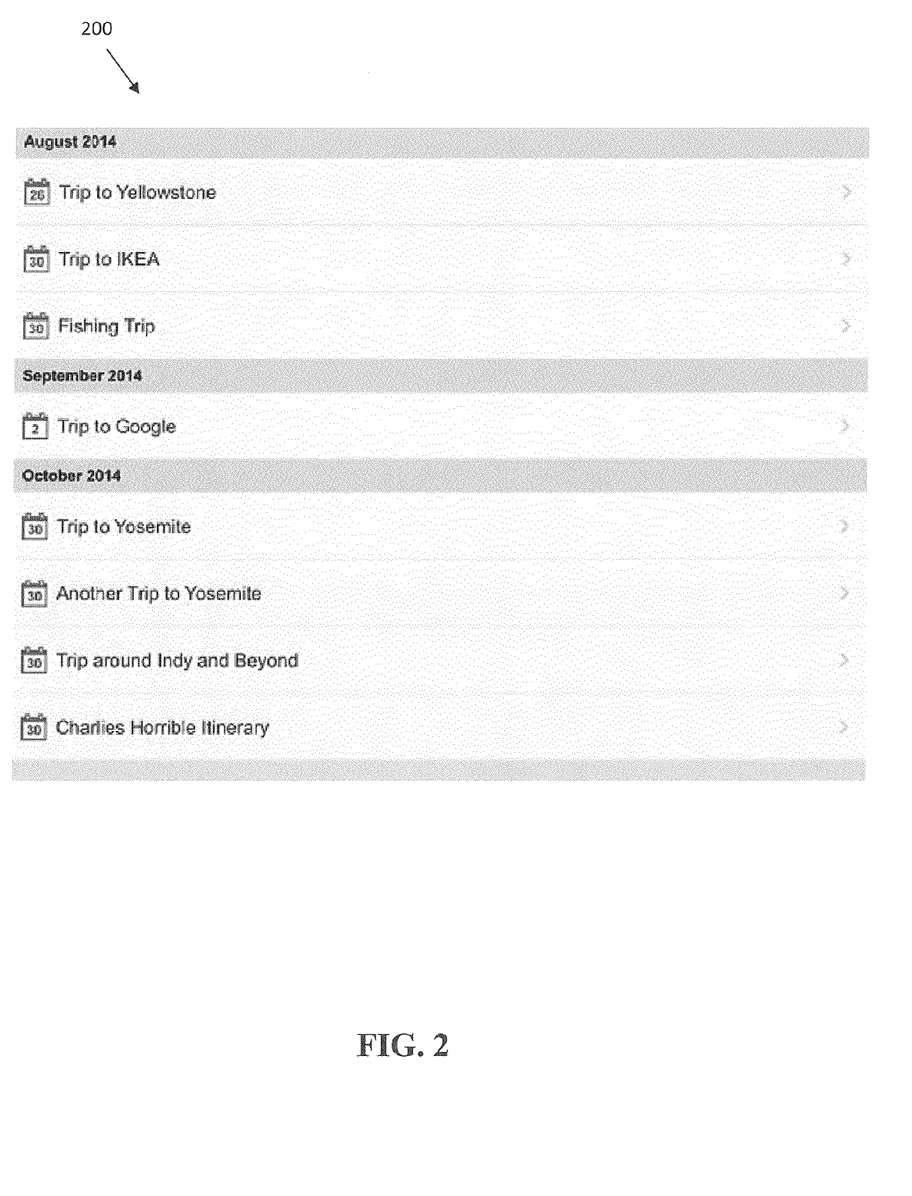
FIG. 2 is an example user interface of an example system for sharing a travel itinerary with a protective detail.
Figure 3:
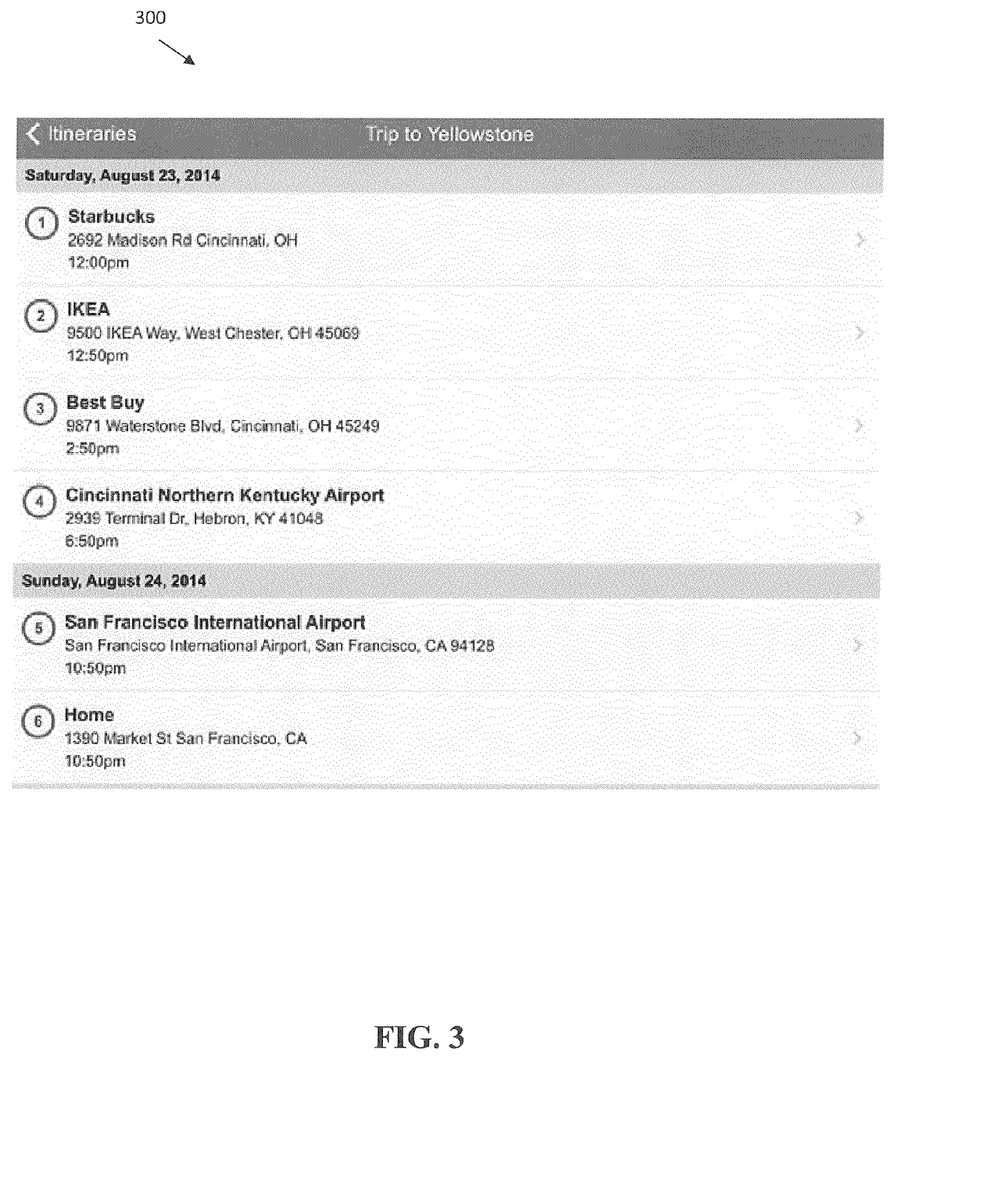
FIG. 3 is an example user interface of an example system for sharing a travel itinerary with a protective detail.

Itinerary computer 102 may provide access to a plurality of itineraries. Accordingly, security detail computer 114 is configured to provide security detail 112, via an itinerary selection interface 200 illustrated in FIG. 2, with an option of selecting one of a plurality of itineraries for viewing. Once an itinerary is selected, security detail computer 114 is configured to provide a security detail 112, via an itinerary detail interface 300 illustrated in FIG. 3, the details or the destinations of the selected itinerary. In one example, itinerary detail interface 300 may be configured to further list the identified and associated landmarks (not shown). Itinerary detail interface 300 may display a name of a destination, an address, a day or time of expected arrival at the destination, and other suitable information about a destination.

Figure 4:
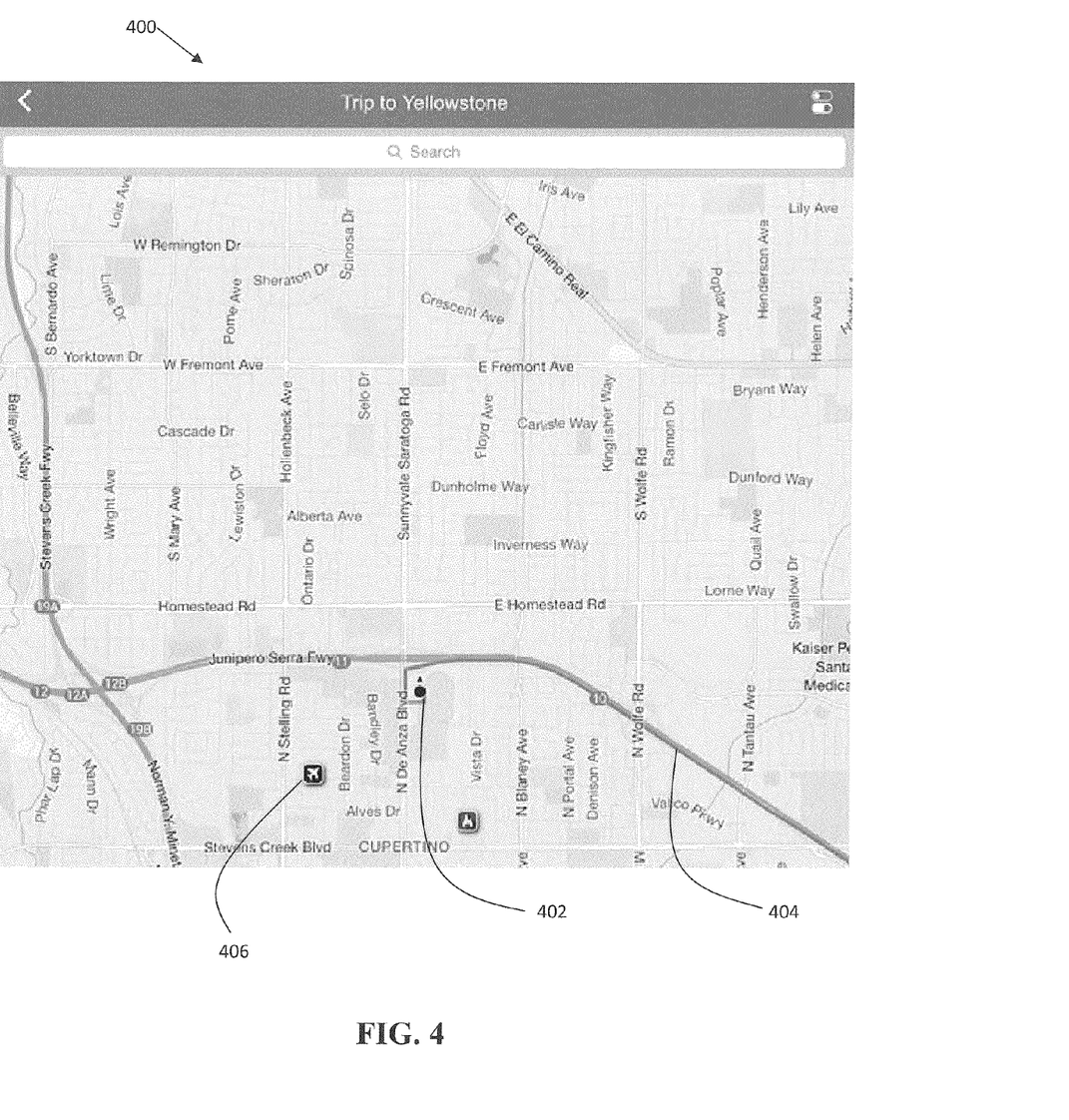
FIG. 4 is an example user interface of an example system for sharing a travel itinerary with a protective detail.
Figure 5:
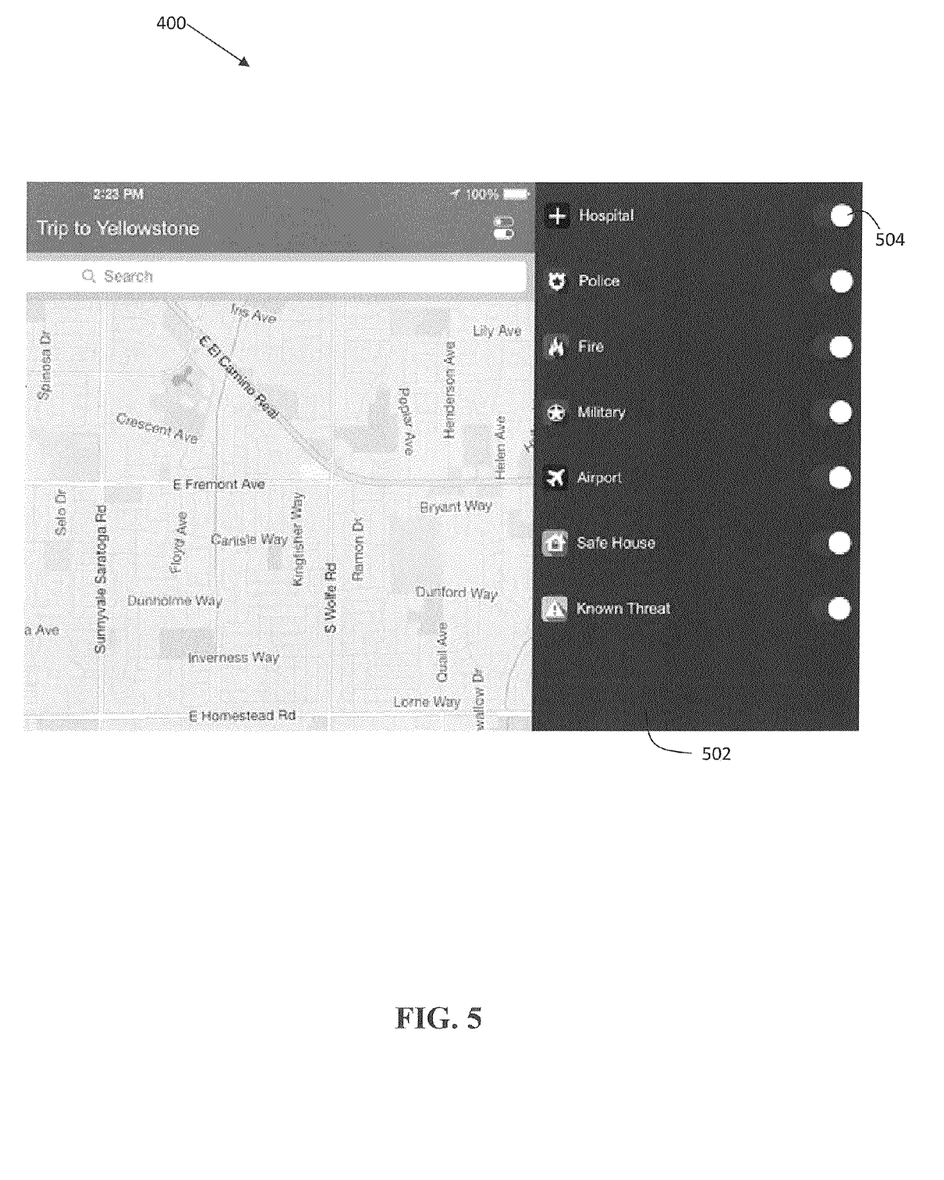
FIG. 5 is an example user interface of an example system for sharing a travel itinerary with a protective detail.

Security detail computer 114 may further be configured to provide, via a map interface 400 illustrated in FIG. 4, a visual depiction of the destinations 402 of a selected itinerary in a map format. In one example, map interface 400 further provides one or more routes 404 that connect the destinations of the itinerary. The map interface 400 further indicates the locations of the landmarks 406 identified and associated with a selected itinerary. In one example, as illustrated in FIG. 5, map interface 400 includes a landmark toggle interface 502 that enables a security detail 112 to select the types of landmarks to be displayed. For example, if security detail doesn't want to see hospitals displayed on the map interface 400, security detail may toggle a switch 504 associated with hospitals to an 'off' or 'hidden' position. The toggle interface 502 similarly provides a toggle button for selecting whether to display or hide a plurality of types of landmarks, including police stations, fire stations, military bases, airports, safe houses, and known threats, for example.

Referring back to FIG. 1, it should be appreciated that, although the system 100 is depicted as including a single itinerary computer 102 for both storing the itinerary 106 as well as processing the itinerary 106, system 100 may include two or more computers in the cloud environment 104. In one example (not shown), a first computer may receive and process an itinerary by identifying and associating landmarks while a second computer may store the processed itinerary including the identified and associated landmarks. In another example, the itinerary computer 102 in the cloud environment 104 may be configured to only receive and store the itinerary 106 without processing the itinerary, meaning without identifying and associating landmarks with the itinerary. Instead, in this example, a security detail computer 114 may be configured to access the unprocessed itinerary 106 from itinerary computer 102 and perform the processing previously described, including identifying and associating landmarks with the itinerary 106.

Figure 6:
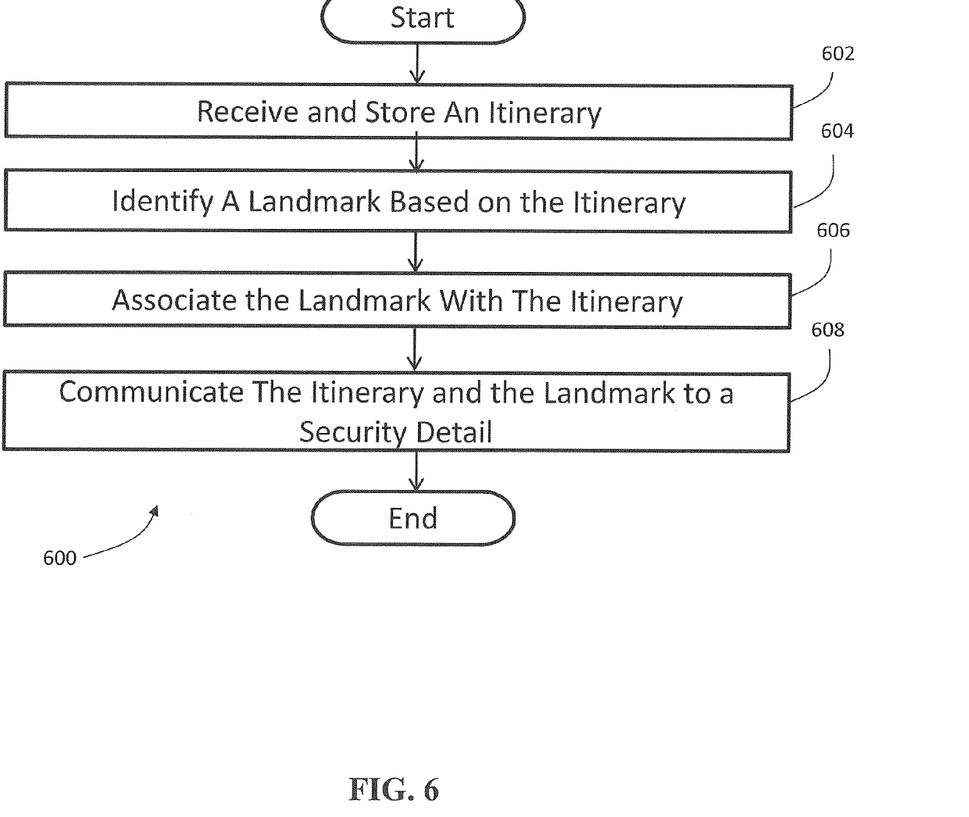
FIG. 6 is an example method for sharing a travel itinerary with a protective detail.

FIG. 6 illustrates a method for sharing a travel itinerary with a protective detail. At step 602, the itinerary computer 102 receives and stores data representative of an itinerary 106. At step 604, the itinerary computer 102 identifies at least one landmark based on the itinerary 106. At step 606, the itinerary computer 102 associates the at least one landmark with the itinerary 106. At step 608, the itinerary computer 102 communicates data representative of the itinerary 106 and the landmark associated with the itinerary to a security detail.

Figure 7:
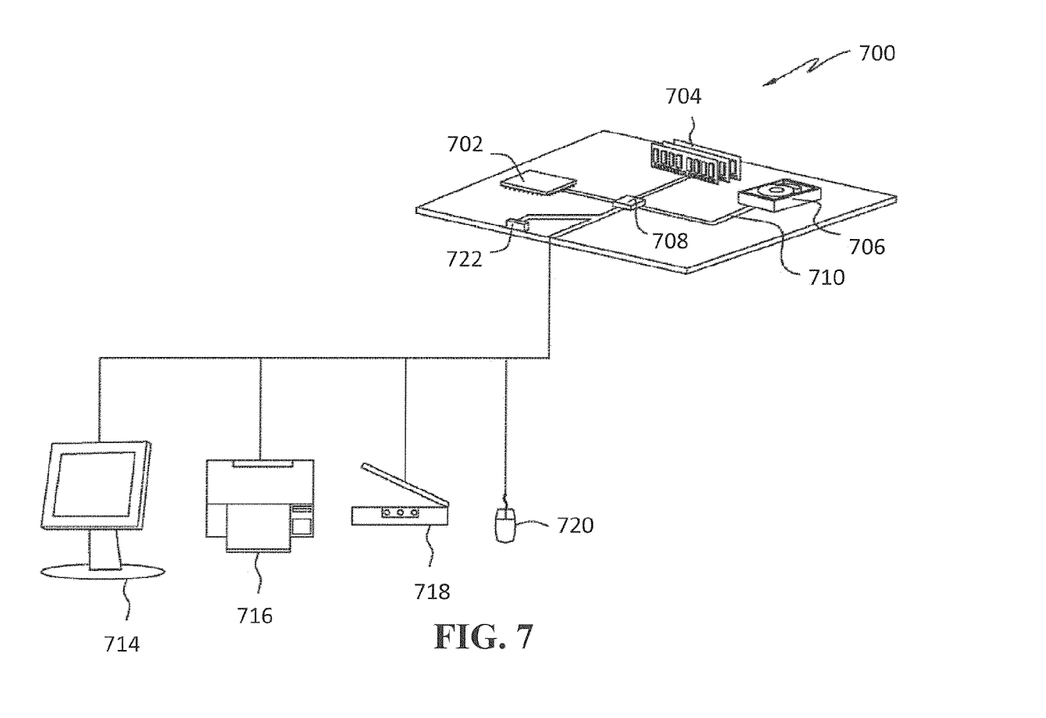
FIG. 7 is a block diagram of an example computer for implementing an example system for sharing a travel itinerary with a protective detail.

FIG. 7 is a schematic diagram of an example computer for implementing the example itinerary computer 102 of FIG. 1. The example computer 700 is intended to represent various forms of digital computers, including laptops, desktops, handheld computers, tablet computers, smartphones, servers, and other similar types of computing devices. Computer 700 includes a processor 702, memory 704, a storage device 706, and a communication port 708, operably connected by an interface 710 via a bus 712.

Processor 702 processes instructions, via memory 704, for execution within computer 700. In an example embodiment, multiple processors along with multiple memories may be used.

Memory 704 may be volatile memory or non-volatile memory. Memory 704 may be a computer-readable medium, such as a magnetic disk or optical disk. Storage device 706 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 704 or storage device 706.

Computer 700 can be coupled to one or more input and output devices such as a display 714, a printer 716, a scanner 718, and a mouse 720.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

What is claimed:

1. A system for sharing a travel itinerary with a plurality of members of a protective detail tasked with protecting the security of an individual and for enabling the plurality of members to communicate updates to the itinerary amongst the protective detail, the system comprising one or more processors, one or more computer-readable tangible storage devices, and program instructions stored on at least one of the one or more storage devices for execution by at least one of the one or more processors, the program instructions comprising first program instructions to receive and store in a cloud environment accessible by a plurality of computing devices associated with a plurality of members of a security detail, data representative of an itinerary comprising at least one destination an individual intends to travel to;

second program instructions to identify a landmark based on the received itinerary;

third program instructions to associate the identified landmark with the itinerary;

fourth program instructions to receive, from a first one of the plurality of computing devices associated with a first one of the plurality of members of the security detail, data indicative of a landmark, newly identified by the first one of the plurality of members of the security detail and previously unidentified by the second program instructions, and to associate the newly identified landmark with the itinerary;

fifth program instructions to receive a request for the itinerary from a second one of the plurality of computing devices associated with a second one of the plurality of members of the security detail; and sixth program instructions to communicate data representative of the itinerary and the associated landmark, including the newly identified landmark, from the cloud environment to the second one of the plurality of computing devices responsive to receiving a request for the itinerary.

2. The system of claim 1, wherein the second program instructions identify a landmark based on the received itinerary in real time responsive to receiving the request for the itinerary, and wherein the program instructions further comprise seventh program instructions to generate a map illustrating the destination and the landmark.

3. The system of claim 1, wherein the program instructions further comprise seventh program instructions to encrypt the data representative of the itinerary and the associated landmark.

4. The system of claim 1, wherein the second program instructions are configured to identify a landmark by determining the geographic location of the at least one destination and selecting a landmark with a geographic location within proximity of the geographic location of the at least one destination.

5. The system of claim 1, wherein the second program instructions are configured to identify a landmark by determining a path to the at least one destination and selecting a landmark with a geographic location within proximity of the path to the at least one destination.

6. The system of claim 1, wherein the first program instructions are configured to receive and store data representative of a plurality of itineraries and wherein the fifth program instructions are configured to communicate data representative of a selected itinerary, from the plurality of itineraries, and the associated landmark.

7. The system of claim 1, wherein the second program instructions are configured to select a landmark from predetermined set of landmarks.

8. The system of claim 1, wherein the second program instructions are configured to identify at least one of a hospital, a police station, a fire station, a military base camp, an airport, a safe house, and a known threat.

9. A method for sharing a travel itinerary with a plurality of members of a protective detail tasked with protecting the security of an individual and for enabling the plurality of members to communicate updates to the itinerary amongst the protective detail, the method comprising the steps of:

a computer receiving and storing, in a cloud environment accessible by a plurality of computing devices associated with a plurality of members of a security detail, data representative of an itinerary comprising at least one destination an individual intends to travel to;

a computer identifying a landmark based on the received itinerary;

a computer associating the identified landmark with the itinerary;

a computer receiving, from a first one of the plurality of computing devices associated with a first one of the plurality of members of the security detail, data indicative of a landmark newly identified by the first one of the plurality of members of the security detail and previously unidentified by the second program instructions, and associating the newly identified landmark with the itinerary;

receiving a request for the itinerary from a second one of the plurality of computing devices associated with a second one of the plurality of members of the security detail; and a computer communicating data representative of the itinerary and the associated landmark, including the newly identified landmark, from the cloud environment to the second one of the plurality of computing device responsive to receiving a request for the itinerary.

10. The method of claim 9, wherein the step of the computer identifying a landmark comprises the computer identifying a landmark based on the received itinerary in real time responsive to receiving the request for the itinerary, and the method further comprising the step of a computer generating a map illustrating the destination and the landmark.

11. The method of claim 9, further comprising the step of encrypting the data representative of the itinerary and the associated landmark.

12. The method of claim 9, wherein the step of the computer identifying the landmark comprises determining the geographic location of the at least one destination and selecting a landmark with a geographic location within proximity of the geographic location of the at least one destination.

13. The method of claim 9, wherein the step of the computer identifying the landmark comprises the computer determining a path to the at least one destination and selecting a landmark with a geographic location within proximity of the path to the at least one destination.

14. The method of claim 9, wherein the first step comprises the computer receiving and storing data representative of a plurality of itineraries and wherein the fourth step comprises the computer communicating data representative of a selected itinerary, from the plurality of itineraries, and the associated landmark.

15. The method of claim 9, wherein the step of the computer identifying the landmark comprises the computer selecting a landmark from predetermined set of landmarks.

16. The method of claim 9, wherein the step of the computer identifying the landmark comprises the computer identifying at least one of a hospital, a police station, a fire station, a military base camp, an airport, a safe house, and a known threat.

17. A computer program product for sharing a travel itinerary with a plurality of members of a protective detail tasked with protecting the security of an individual and for enabling the plurality of members to communicate updates to the itinerary amongst the protective detail, comprising one or more computer-readable tangible storage devices and program instructions stored on at least one of the one or more storage devices, the program instructions comprising:

first program instructions to receive and store in a cloud environment accessible by a plurality of computing devices associated with a plurality of members of a security detail, data representative of an itinerary comprising at least one destination;
second program instructions to identify a landmark based on the received itinerary;
third program instructions to associate the identified landmark with the itinerary;
fourth program instructions to receive from a first one of the plurality of computing devices associated with a first one of the plurality of members of the security detail, data indicative of a landmark, newly identified by the first one of the plurality of members of the security detail and previously unidentified by the second program instructions, and to associate the newly identified landmark with the itinerary;
fifth program instructions to receive a request for the itinerary from a second one of the plurality of computing devices associated with a second one of the plurality of members of the security detail; and
sixth program instructions to communicate data representative of the itinerary and the associated landmark, including the newly identified landmark, from the cloud environment to the second one of the plurality of computing devices responsive to receiving a request for the itinerary.

18. The computer program product of claim 17, wherein the second program instructions identify a landmark based on the received itinerary in real time responsive to receiving the request for the itinerary, and wherein the program instructions further comprise seventh program instructions to generate a map comprising the destination and the landmark.

19. The computer program product of claim 17, wherein the program instructions further comprise seventh program instructions to encrypt the data representative of the itinerary and the associated landmark.

20. The computer program product of claim 17, wherein the second program instructions are configured to identify at least one of a hospital, a police station, a fire station, a military base camp, an airport, a safe house, and a known threat.

* * * * *